United States Patent
Christensen et al.

(10) Patent No.: US 6,711,629 B1
(45) Date of Patent: Mar. 23, 2004

(54) TRANSPARENT SUPPORT OF REMOTE I/O IN A PROCESS CONTROL SYSTEM

(75) Inventors: Daniel D. Christensen, Austin, TX (US); Steven L. Dienstbier, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/420,356

(22) Filed: Oct. 18, 1999

(51) Int. Cl.⁷ .................................................. G06F 3/00
(52) U.S. Cl. ............................... 710/8; 710/10; 710/11; 709/225; 709/227; 709/228
(58) Field of Search ............................... 709/225, 227, 709/228, 230; 710/8, 10, 11

(56) References Cited

U.S. PATENT DOCUMENTS

| | | | |
|---|---|---|---|
| 4,302,820 A | 11/1981 | Struger et al. ............... | 364/900 |
| 4,663,704 A | 5/1987 | Jones et al. ................... | 364/188 |
| 4,672,530 A | 6/1987 | Schuss ......................... | 364/133 |
| 4,689,786 A | 8/1987 | Sidhu et al. ................... | 370/74 |
| 4,916,610 A | 4/1990 | Bapat .......................... | 364/300 |
| 5,006,992 A | 4/1991 | Skeirik ........................ | 364/513 |
| 5,063,523 A | 11/1991 | Vrenjak ....................... | 364/514 |
| 5,129,087 A | 7/1992 | Will ........................... | 395/650 |
| 5,134,574 A | 7/1992 | Beaverstock et al. .. | 364/551.01 |
| 5,155,842 A | 10/1992 | Rubin ......................... | 395/575 |
| 5,293,466 A | 3/1994 | Bringmann ................. | 395/114 |
| 5,307,346 A * | 4/1994 | Fieldhouse .................. | 370/254 |
| 5,311,562 A | 5/1994 | Palusamy et al. ........... | 376/215 |
| 5,371,895 A | 12/1994 | Bristol ........................ | 395/800 |
| 5,432,711 A | 7/1995 | Jackson et al. ............. | 364/514 |
| 5,442,639 A | 8/1995 | Crowder et al. ............ | 371/20.1 |
| 5,444,851 A | 8/1995 | Woest ..................... | 395/200.1 |
| 5,475,856 A | 12/1995 | Kogge ........................ | 395/800 |
| 5,481,741 A | 1/1996 | McKaskle et al. ........... | 395/800 |
| 5,485,620 A | 1/1996 | Sadre et al. ................. | 395/700 |
| 5,491,791 A | 2/1996 | Glowny et al. ......... | 395/183.13 |
| 5,493,534 A | 2/1996 | Mok .......................... | 365/226 |
| 5,504,902 A | 4/1996 | McGrath et al. ............ | 395/700 |

(List continued on next page.)

FOREIGN PATENT DOCUMENTS

| | | | |
|---|---|---|---|
| DE | 522 590 | 1/1993 | |
| GB | 2 208 553 | 4/1989 | |
| GB | 2 336 977 | 8/1998 | ........... H04L/12/40 |
| WO | 0 147 160 | 7/1985 | ........... H04L/11/00 |
| WO | WO 92/21199 | 11/1992 | .......... H04M/11/00 |
| WO | WO 95/04314 | 2/1995 | |
| WO | WO 95/17062 | 6/1995 | ........... H04L/29/06 |
| WO | WO 95/27943 | 10/1995 | ........... G06F/13/38 |
| WO | WO-97/31454 A1 | 8/1997 | |
| WO | WO 97/35402 | 9/1997 | ............. H04L/9/00 |

OTHER PUBLICATIONS

Baldasserini, Denmac delivers LAN stats (Denmac System Inc's TrenData 2.0), Computer Shopper, v15, n6, p613(1).

(List continued on next page.)

Primary Examiner—Ilwoo Park
Assistant Examiner—Harold Kim
(74) Attorney, Agent, or Firm—Marshall, Gerstein & Borun LLP

(57) ABSTRACT

A system and method configures a communication link in a process control system having a controller connected to an I/O device via a remote I/O communication link, which has a local and a remote I/O interface communicatively coupled via a remote I/O communication bus. The system and method specifies a remote connection between the controller and the I/O device, recognizes that the remote connection requires communications over the remote I/O communication link, and automatically generates communication objects to route communications between the controller and the I/O device via the remote I/O communication link.

29 Claims, 7 Drawing Sheets

U.S. PATENT DOCUMENTS

| | | | | |
|---|---|---|---|---|
| 5,513,095 | A | | 4/1996 | Pajonk ........................ 364/131 |
| 5,519,706 | A | | 5/1996 | Bantz et al. ................ 370/85.3 |
| 5,519,878 | A | | 5/1996 | Dolin, Jr. ..................... 395/800 |
| 5,524,269 | A | | 6/1996 | Hamilton et al. ............ 395/829 |
| 5,526,489 | A | * | 6/1996 | Nilakantan et al. ..... 340/825.52 |
| 5,530,643 | A | | 6/1996 | Hodorowski ................. 364/191 |
| 5,537,414 | A | | 7/1996 | Takiyasu et al. ............ 370/95.1 |
| 5,549,137 | A | | 8/1996 | Lenz et al. ................... 137/486 |
| 5,550,980 | A | | 8/1996 | Pascucci et al. ........ 395/200.05 |
| 5,566,320 | A | | 10/1996 | Hubert ......................... 395/474 |
| 5,576,946 | A | | 11/1996 | Bender et al. ............... 364/146 |
| 5,596,723 | A | | 1/1997 | Romohr ................. 395/200.16 |
| 5,623,592 | A | | 4/1997 | Carlson et al. .............. 395/348 |
| 5,675,748 | A | | 10/1997 | Ross ............................ 395/284 |
| 5,682,476 | A | | 10/1997 | Tapperson et al. ...... 395/200.05 |
| 5,701,411 | A | | 12/1997 | Tran et al. ................ 395/200.1 |
| 5,706,007 | A | | 1/1998 | Fragnito et al. ............. 341/155 |
| 5,838,563 | A | | 11/1998 | Dove et al. .................. 364/188 |
| 5,978,593 | A | * | 11/1999 | Sexton ........................... 710/1 |
| 6,032,199 | A | * | 2/2000 | Lim et al. .................... 709/316 |
| 6,330,622 | B1 | * | 12/2001 | Schaefer ......................... 710/8 |

OTHER PUBLICATIONS

Blackwell, The benefits won't kick–in immediately (Microsoft Windows 95 operating system's multimedia benefits), Computing Canada, v21, n18, p36(2).

John R. Gyorki, "PLC drive standard busses", Machine Designs, May 11, 1995, pp. 83–90.

Moore Products Co., "Control System", POWER Apr. 1995, p. 114, vol. 139, No. 4, Copyright 1995, McGraw–Hill, Inc.

Moore Products Co., "Apacs Control System", POWER Jun., 1995, p. 81, vol. 139, No. 6, Copyright 1995, McGraw–Hill, Inc.

Robert R. Lyons, "New Telemacanique Programmable Controllers Feature Multiple Programming Languages", Telemacanique , Arlington Heights, IL, Feb. 11, 1995.

Clifford J. Peshek et al., "Recent Development and Future Trends in PLC Programming Languages and Programming Tools for Real–Time Control", IEEE Cement Industry Technical Conference, May 1993, Toronto, Canada, pp. 219–230.

C.K. Duffer et al., "High–Level Control Language Customizes Application Programs", Power Technologies, Inc., IEEE Computer Applications in Power, © Apr. 1991, pp. 15–18.

H.J. Beestermöller et al., "An online and offline programmable Multiple–Loop Control for Distributed Systems", © 1994 IEEE, pp. 15–20.

PCT/US 98/01573 International Search Report, dated Nov. 25, 1998.

UK Patent Office Search Report under Section 17, dated Jun. 15, 2001.

Great Britain Examination Report of application No. GB 0025369.0 dated Jul. 28, 2003.

\* cited by examiner

TRANSPARENT SUPPORT OF REMOTE I/O IN A PROCESS CONTROL SYSTEM

FIELD OF THE INVENTION

The invention relates generally to process control systems and, more specifically, to a system and method for automatically configuring a remote input/output (I/O) communication link in a process control system.

DESCRIPTION OF THE RELATED ART

Modern process control systems are typically microprocessor-based distributed control systems (DCSs). A traditional DCS configuration includes one or more user interface devices, such as workstations, connected by a databus (e.g., Ethernet) to one or more controllers. The controllers are generally physically close to a controlled process and are in communication with numerous electronic monitoring devices and field devices such as electronic sensors, transmitters, current-to-pressure transducers, valve positioners, etc. that are located throughout the process.

In a traditional DCS, control tasks are distributed by providing a control algorithm within each of the controllers. The controllers independently execute the control algorithms to control the field devices coupled to the controllers. This decentralization of control tasks provides greater overall system flexibility. For example, if a user desires to add a new process or part of a process to the DCS, the user can add an additional controller (having an appropriate control algorithm) connected to appropriate sensors, actuators, etc. Alternatively, if the user desires to modify an existing process, new control parameters or control algorithms may, for example, be downloaded from a user interface to an appropriate controller via the databus.

To provide for improved modularity and inter-manufacturer compatibility, process controls manufacturers have more recently moved toward even further decentralization of control within a process. These more recent approaches are based on "smart" field devices that communicate using an open protocol such as the HART®, PROFIBUS®, WORLDFLIP®, Device-Net®, CAN, and FIELDBUS® protocols. These smart field devices are essentially microprocessor-based devices such as sensors, actuators, etc. that, in some cases, such as with Fieldbus devices, also perform control loop functions traditionally executed by a DCS controller. Because some smart field devices provide control capability and communicate using an open protocol, field devices from a variety of manufacturers can communicate with one another on a common digital databus and can interoperate to execute a control loop without the intervention of a traditional DCS controller.

In conventional process control systems, field devices may be connected directly to a controller or, alternatively, may be connected to one or more I/O devices that are communicatively coupled to the controller via a databus. Generally speaking, these I/O devices process analog and/or digital information provided by the field devices and send the processed information as digital messages containing control signals, device information, etc. to the controller over the controller databus. Additionally, the controller can send digital messages containing configuration information, commands, etc. over the controller databus to the I/O devices. The digital messages sent by the controller to the I/O devices may be used to change the manner in which the I/O devices process signals received from the field devices and/or may be used to send signals to the field devices.

Traditional I/O devices send and receive analog and digital signals, such as 4–20 mA, 0–10 VDC, dry contact closures, etc., to and from standard field devices. More recently, however, linking or bridge I/O devices have become available that enable a network of smart field devices, such as the Fieldbus devices discussed above, to communicate with the controller using digital messages via the controller databus.

In practice, I/O devices are typically located physically close to the field devices to which they are connected and may reside on a common mounting rail that facilitates their connection to a power source and to the controller databus. Thus, in applications where some of the field devices are physically remote from the locus of the process control system, it becomes desirable to locate some of the I/O devices so that these I/O devices are close to the remotely situated field devices. However, simply extending the controller databus to connect with remotely situated or remote I/O devices presents significant difficulties because the controller databus is typically not suitable for reliable communications over the required distance to the remote I/O devices.

A variety of well-known communication media (e.g., wireless, fiber optic, coaxial cable, etc.) and communication protocols (e.g., High Speed Ethernet) are available for long distance communications and, generally speaking, can provide a reliable remote communication link between remote I/O devices and a controller. While these known techniques for accomplishing remote communications may allow controllers to communicate with remote I/O devices (and the field devices associated with the remote I/O devices), they do not allow a seamless integration of the remote I/O devices within a process control system. For example, because the controller databus and the communication link to the remote I/O devices typically use different media and/or different communication protocols, the controller may communicate with the remote I/O devices via a remote I/O interface device that requires intensive manual integration by the user.

The integration of the remote I/O interface may involve a device-by-device configuration requiring the user to manually define and instantiate complex communication links for routing information between the controller and the remote I/O devices via the remote I/O communication link. As a result, the system user must be proficient with the particular communication configuration attributes associated with the local I/O devices and must additionally be proficient with the particular communication configuration attributes of the remote I/O interface device, which may be remarkably different from the communication configuration attributes of the local I/O devices. This intensive manual integration of remote I/O devices is undesirable because the "look and feel" of the system is inconsistent when the user attempts to incorporate remote I/O devices into a control loop of a local controller. For example, a graphical interface may allow a user to associate icons representing devices to establish connections (e.g., using a mouse or any other conventional computer-based pointing device) in a control loop between local I/O devices, but may require the user to define control loop connections to remote I/O devices using a completely different method, such as, for example, entering a series of textual commands via a keyboard connected to the user interface.

SUMMARY OF THE INVENTION

The system and method described herein enables the seamless integration of remotely situated I/O devices within a process control system. Generally speaking, the system and method automatically configures a remote I/O interface device at each end of a remote I/O communication link so that all communication activities (e.g., configuration, runtime reporting, user requests for information via the user interface, etc.) with the remote I/O devices over the remote I/O communication link appear to be transparent from the perspective of a user at a user interface and a controller that is communicating over the remote I/O communication link.

More specifically, the system and method automatically establishes communication objects in the pair of remote I/O interface devices situated at respective ends of the remote I/O communication link. In particular, a local communication object is established in the remote I/O interface which is connected to the controller and a remote communication object is established in the remote I/O interface which is connected to the remote I/O devices. The communication objects provide communication links that enable the routing of communications between the controller and the remote I/O devices via the remote I/O communication link.

One particularly interesting aspect of the system and method described herein is that the user can interact at the system level through a graphic interface running on the user interface, for example, to configure control loops, monitor process parameters, etc. associated with a combination of local and remote I/O devices, which may be communicating using one or more communication technologies (i.e., media and/or protocols), without having to understand, or even be aware of, the underlying communication technologies. In other words, the system and method described herein insulates the user from the implementation details of the underlying remote I/O communication technologies by automatically generating and instantiating appropriate communication objects (e.g., the local and remote communication objects) within the remote I/O interface devices in response to the user requesting a control loop connection to a remote I/O device. In one embodiment, the system and method automatically recognizes that the user has requested communications (e.g., via a control loop connection) with a remote I/O device that requires communications via the remote I/O communication link, creates communication objects to enable and carry out these remote communications, and loads these communication objects in the appropriate I/O devices during configuration to provide the communications specified by the user. As a result, the user only needs to understand how to use the graphical interface, for example, to interact with the control system and the user's interaction with the system has a consistent look and feel regardless of whether or not the user has specified a connection to a remote or to a local I/O device and regardless of the underlying communication technologies being used to accomplish the remote I/O communications.

In accordance with one aspect of the invention, a method of configuring a communication link for use in a distributed process control system having a controller, a first remote I/O interface communicatively coupled to the controller and a remote I/O communication link, a second remote I/O interface communicatively coupled to the remote I/O communication link, and an I/O device communicatively coupled to the second remote I/O interface, specifies a connection between the controller and the I/O device. The method may recognize that the remote connection requires communications over the remote I/O communication link and automatically generate a first communication object that automatically routes communications between the controller and the remote I/O communication link and may also automatically generate a second communication object that automatically routes communications between the remote I/O communication link and the I/O device.

The method may further automatically generate the first communication object so that the first communication object receives communications having a first signal protocol and converts the communications to be sent using a second signal protocol and may generate the second communication object so that the second communication object receives communications having the second signal protocol and converts the communications to be sent using the first signal protocol.

DESCRIPTION OF THE PREFERRED EMBODIMENTS

While a system and method for automatically configuring a remote I/O communication link and carrying out communications with remotely situated input/output (I/O) devices over the remote I/O communication link is described in detail in conjunction with a particular process control system, it should be understood that the system and method described herein can be advantageously used within a variety of process control systems having a remote I/O communication link that uses any of a variety of communications media such as wireless/spread spectrum, fiber optic, etc. and communication protocols such as Fieldbus, AS-Interface, Profibus, DeviceNet, etc.

Figure 1:
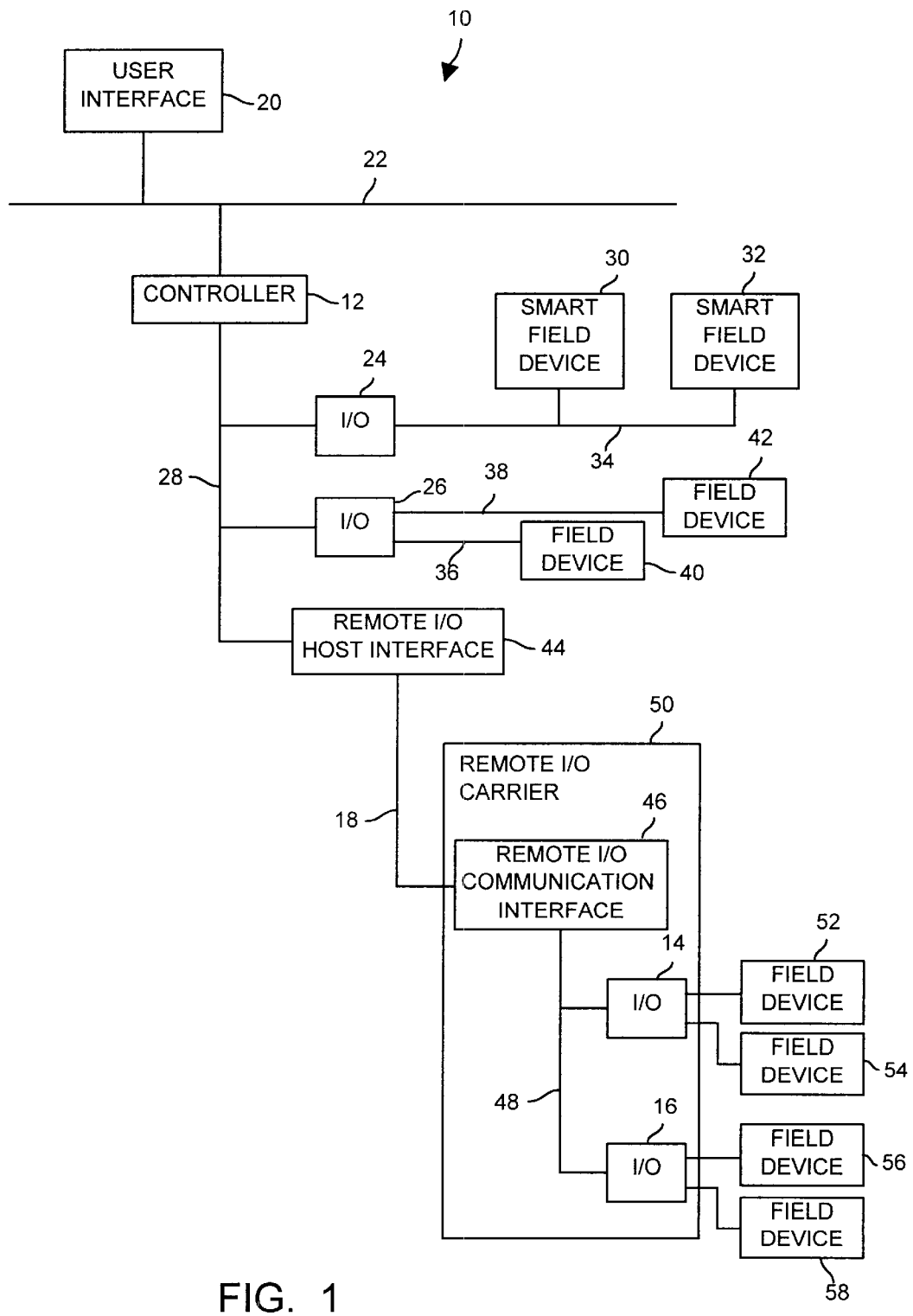
FIG. 1 is a schematic block diagram illustrating a process control system having a controller that is communicatively coupled to remote I/O devices via a remote communication link.

FIG. 1 is a schematic block diagram illustrating a process control system 10 having a controller 12 that is communicatively coupled to remote I/O devices 14 and 16 via a remote I/O communication link 18. The control system 10 includes a user interface 20, which may be a workstation, that is connected in a communication network to the controller 12 via a system level databus 22. The system level databus 22 may be a standard Ethernet databus or any other databus suitable for the transmission of data. The controller 12 may be a DCS controller and may communicate with the user interface 20 using a proprietary communication protocol, or in any other suitable manner, via the system level databus 22. For example, the controller 12 may send alarm and status information to the user interface 20 and may additionally receive user commands/requests from the user interface 20 via the system level databus 22. The controller 12 may further include control algorithms for use in controlling field devices that are connected to the controller 12 in any conventional or any other desired manner.

By way of example, the controller 12 is in communication with I/O devices 24 and 26 via a controller databus 28 which typically uses a proprietary signal protocol. The I/O device 24 may function as a communication bridge or a linking device to smart field devices 30 and 32 that are communicatively coupled to one another and to the I/O device 24 via a non-proprietary protocol databus 34. The smart field devices 30 and 32 may be, for example, Fieldbus devices and, accordingly, the non-proprietary protocol databus 34 may use the Fieldbus signal protocol. As is well-known, the smart field devices 30 and 32 may be configured to execute one or more process control loops either in conjunction with or independently from the controller 12. However, other types of devices and protocols could be used without departing from the scope of the invention. In contrast, the I/O device 26 may be a standard I/O device, such as an analog input (AI) card, analog output (AO) card, etc., that communicates via wires 36 and 38 to respective conventional field devices 40 and 42.

The controller 12 is also in communication with a remote I/O host interface 44 that allows the controller 12 to communicate transparently with the remote I/O devices 14 and 16 via the remote communication link 18. More specifically, the remote I/O interface 44 communicates with the controller 12 over the controller databus 28 using the appropriate proprietary signal protocol and sends/receives information over the remote communication link 18 to/from a remote communication interface 46 using a conventional remote communications signal protocol (e.g., High Speed Ethernet), which is typically different than the proprietary signal protocol of the controller databus 28. Similarly, the remote communication interface 46 sends and receives signals over the remote I/O communication link 18 using the conventional remote communications signal protocol and routes these signals to and from the remote I/O devices 14 and 16 through a remote databus 48 that may use a proprietary signal protocol. In fact, this proprietary signal protocol may be the same protocol as the signal protocol that is used on the controller databus 28.

In particular, the remote I/O host interface 44 communicates with the controller 12 over the controller databus 28 using the proprietary signal protocol that is used on the controller databus 28 and processes (i.e., converts) these communications using communication objects (which are discussed in more detail below) to send the processed communications over the remote I/O communication link 18 using the conventional remote signal communications protocol. Likewise, the remote I/O communication interface 46 converts communications, using communication objects, on the remote I/O communication link 18 to send the communications over the remote databus 48 using the same proprietary signal protocol that is used on the controller databus 28. Thus, the remote I/O communication interfaces 44 and 46 (together with the communication objects) perform a signal protocol conversion/de-conversion at respective ends of the remote I/O communication link 18 so that the signal protocol used on the remote I/O communication link 18 is transparent to the controller 12 that may be, for example, communicating over the link 18 with one of the remote I/O devices 14 and 16. In fact, the controller 12 can communicate with one or more of the I/O devices 14 and 16 as if the I/O devices 14 and 16 are communicating directly on the controller databus 28. Additionally, the remote communication interface 46 and the remote I/O devices 14 and 16 may be mounted in a remote I/O carrier 50 that facilitates the mechanical mounting of the remote communication interface 46 and the remote I/O devices 14 and 16 and which facilitates the electrical connections of the I/O devices 14 and 16 to the remote communication interface 46 and to the field devices 52–58.

Figure 2:
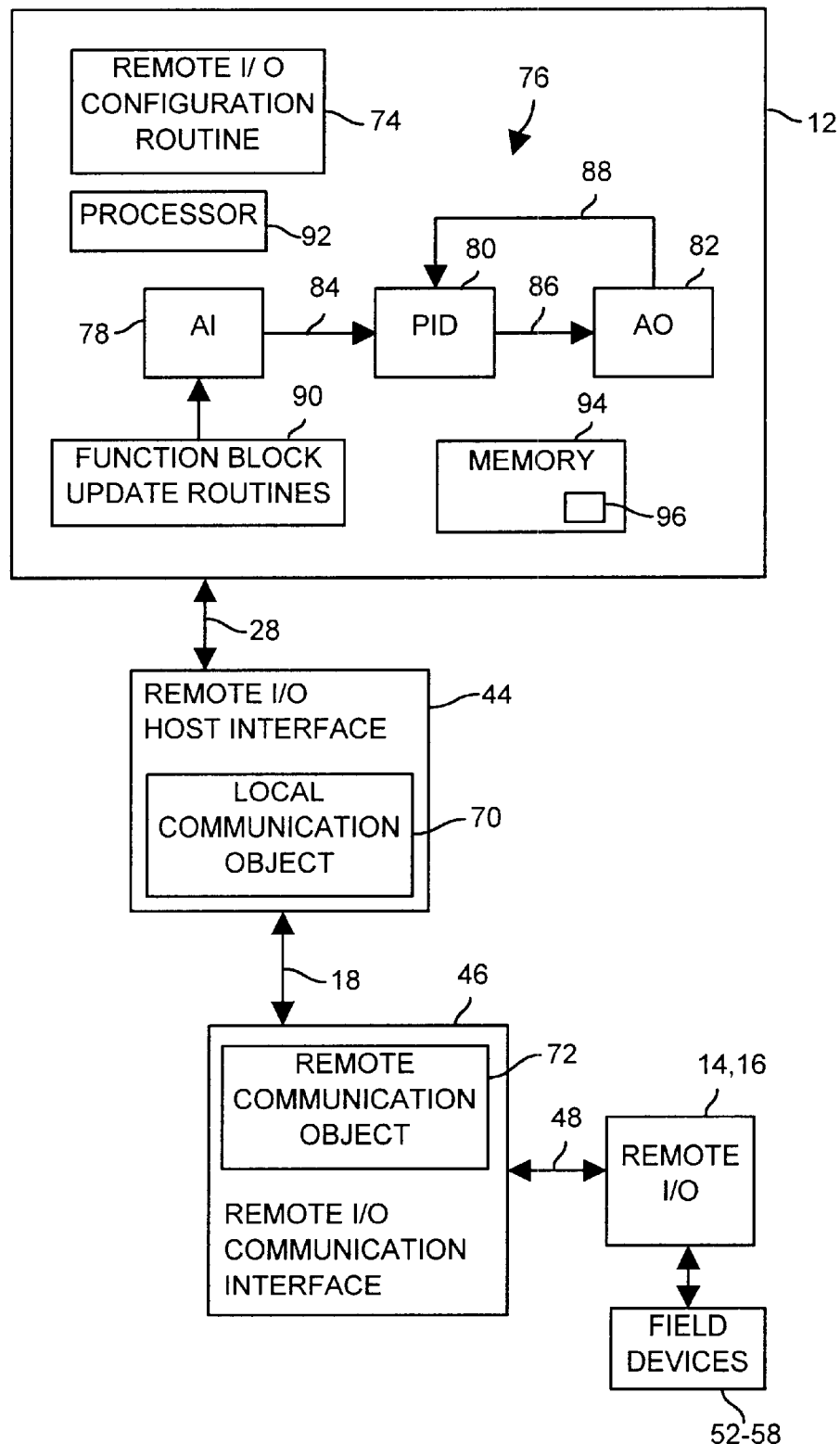
FIG. 2 is an exemplary block diagram illustrating communication objects that enable automatic communications between the controller and the remote I/O devices of FIG. 1.

FIG. 2 is an exemplary block diagram illustrating a local communication object 70 and a remote communication object 72 that enable transparent communications between the controller 12 and the remote I/O devices 14 and 16 of FIG. 1. Generally speaking, the communication objects 70 and 72 cooperate to provide the communication links needed to transmit information between the remote I/O devices 14 and 16 and the controller 12 via the remote I/O communication link 18. More specifically, the local communication object 70 allows information to be transmitted between the controller databus 28 and the remote I/O communication link 18 and the remote communication object 72 allows the remote I/O communication interface 46 to transmit information between the remote communication link 18 and the remote databus 48. For example, the controller 12 may be configured to periodically publish control information to the remote I/O host interface 44 via the controller databus 28 and the remote I/O host interface 44 uses the local communication object 70 to route this control information over the remote I/O communication link 18 to the remote I/O communication interface 46. The remote I/O communication interface 46 may then use the remote communication object 72 to periodically publish the control information to an appropriate one of the I/O devices 14 and 16 via the remote databus 48. Similarly, the controller 12 may be configured to subscribe to control information that is provided by one of the remote I/O devices 14 and 16 and, in that case, the remote I/O communication interface 46 is configured to periodically retrieve the control information needed by the controller 12 from one of the remote I/O devices 14 and 16 via the remote databus 48. The remote I/O communication interface 46 may then use the remote communication object 72 to send the control information over the remote communication link 18 to the remote I/O host interface 44. Upon receiving the control information from the remote I/O communication link 18, the remote I/O interface 44 uses the local communication object 70 to periodically publish the control information to the controller 12 via the controller databus 28.

As is generally known, communication objects, such as the communication objects 70 and 72, receive information in the form of digital messages and route these digital messages to destinations based on addresses or paths specified within the messages. For example, the local communication object 70 may receive a message which includes an address which fully specifies a routing or communication path over the remote I/O communication link 18, through the remote I/O communication interface 46, and to the I/O device 14. Thus, when the remote I/O host interface 44 receives and processes this message using the local communication object 70, the remote I/O host interface 44 will recognize that a portion of the address specified within the message indicates that the message is to be transmitted to the remote I/O communication interface 46 and then transmit the message over the remote I/O communication link 18 to the remote I/O communication interface 46. The remote I/O communication interface 46 receives the message and uses the remote communication object 72 to determine that another portion of the specified address indicates that the message is to be published to the I/O device 14. The remote I/O communication interface 46 then publishes the message on the remote databus 48 to be received by the remote I/O device 14.

The controller 12 may also include a remote I/O configuration routine 74 that automatically creates the communication objects 70 and 72 in response to the user specifying (via the user interface) a control loop connection, for example, to one or more of the remote I/O devices 14 and 16. Because the remote I/O configuration routine 74 automatically creates the communication objects 70 and 72, the user does not have to understand the particular communication attributes associated with the remote I/O communication link 18. Instead, the user only needs to specify the control loop connection to one of the remote I/O devices 14 and 16 and the remote I/O configuration routine 74 automatically recognizes that the connection specified by the user requires communications over the remote I/O communication link 18 and automatically sets up the appropriate communication objects 70 and 72 in the respective remote I/O interfaces 44 and 46. Although the automatic generation of the communication objects 70 and 72 has been discussed above within the context of the user specifying a control loop connection to one of the remote I/O devices 14 and 16, the communication objects 70 and 72 may be similarly generated during runtime, for example, in response to the user making a request for information provided by one of the remote I/O devices 14 and 16 via the user interface 20.

In particular, the controller 12 may execute a control loop 76 having an analog input (AI) block 78, a proportional-integral-derivative (PID) block 80, and an analog output (AO) block 82 which may be, for example, Fieldbus type function blocks. As shown, the AI block 78 provides an output 84 to the PID block 80, the PID block 80 provides an output 86 to the AO block 82, and the AO block 82 provides a feedback signal 88 to the PID block 80. If, for example, the AI block 78 is to receive its input from the I/O device 14, then the configuration routine 74 recognizes that the input needed from the I/O device 14 requires the controller 12 to communicate over the remote I/O communication link 18. As a result of recognizing that the input to the AI block 78 requires communications over the remote I/O communication link 18, the remote I/O configuration routine 74 automatically creates appropriate links by setting up the communication objects 70 and 72 to enable the information from the I/O device 14 to be routed through the remote I/O communication link 18 and the remote I/O interfaces 44 and 46 to the controller 12 on a periodic basis.

The controller 12 may also include function block update routines 90, a processor 92, and a memory 94. Generally speaking, the function block update routines 90 provide decoupling between the control process (which may be executed by the processor 92) associated with the control loop 76 and the communications over the controller databus 28. The function block update routines 90 may maintain a table or a list 96 that includes control information needed by or provided by the function blocks 78, 80 and 82. In this manner, the control loop 76 may be executed asynchronously with respect to the communications between the controller 12 and the remote I/O host interface 44. For example, while the remote I/O host interface 44 is publishing the information needed by the AI block 78 to the controller 12 via the controller databus 28, the function block update routines 90 may be retrieving the information needed by the block 78 from the list 96. Likewise, the function block update routines 90 may store information associated with the control loop 76 in the list 96 and this stored information may be published by the controller 12 on the databus 28. Thus, the function block update routines 90 and the control process 76 can independently access the list 96, thereby allowing the control process 76 and the communications on the controller databus 28 to operate asynchronously (i.e., decoupled) from one another so that execution of the control loop 76 is not interrupted or delayed by the communications on the controller databus 28.

Figure 3:
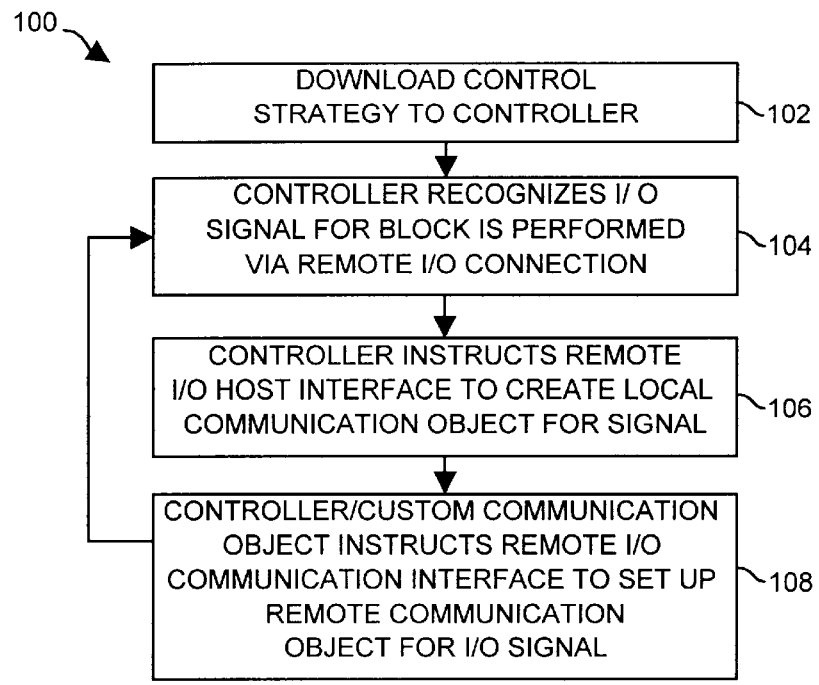
FIG. 3 is an exemplary flow diagram depicting one method of generating and instantiating the communication objects of FIG. 2.

FIG. 3 is an exemplary flow diagram depicting one method 100 of configuring the communication objects 70 and 72 of FIG. 2. In general, the method 100 of FIG. 3 enables the controller 12 to insulate the user from the communication technology associated with the remote I/O link 18. The method 100 automatically recognizes, during configuration, for example, when a control signal needed by the controller 12 requires communications over the remote I/O communication link 18 and automatically creates communication objects in both the remote I/O host interface 44 and the remote I/O communication interface 46 that enable these communications to occur in a transparent manner. Thus, the user, who may be, for example, configuring a control loop by interacting with a graphical interface program running on the user interface 20 does not have to understand or even be aware of the particular communication links and objects that are needed to accomplish the communications over the remote I/O communication link 18. Rather, the user may simply specify that information from the remote I/O devices 14 and 16 be exchanged with the controller 12 and the remote I/O configuration routine 74 sets up the appropriate communication objects 70 and 72 without requiring any further input from the user. In this manner, the user's interaction with the system 10 during configuration has a consistent look and feel because the user requests, at a high level (e.g., from the graphical interface), that the controller 12 exchange information with the remote I/O devices 14 and 16 and the remote I/O configuration routine 74 establishes (without any further input from the user) the local and remote communication objects 70 and 72 which enable the controller 12 to communicate with the remote I/O devices 14 and 16 to exchange the information as specified by the user or as needed to perform a control loop.

In particular, as shown in FIG. 3, block 102 downloads a control strategy to the controller 12 which may include one or more control loops, such as the control loop 76 shown in FIG. 2. Block 104 recognizes that an I/O signal for a function block is performed via the remote I/O communication link 18. For example, the AI block 78 (FIG. 2) may receive its input from one of the remote I/O devices 14 and 16. Recognizing that an I/O signal requires communications over the remote I/O communication link 18 may be accomplished, for example, by determining that an identifier such as a tag or address associated with an I/O device indicates that the device is a remote I/O device. Block 106 instructs the remote I/O host interface 44 to set up the appropriate local communication object 70 for the I/O signal (e.g., the input to the AI block 78) within the remote I/O host interface 44 and block 108 then uses the local communication object 70 to communicate over the remote I/O communication link 18 to set up the appropriate remote communication object 72 within the remote I/O communication interface 46.

Figure 4:
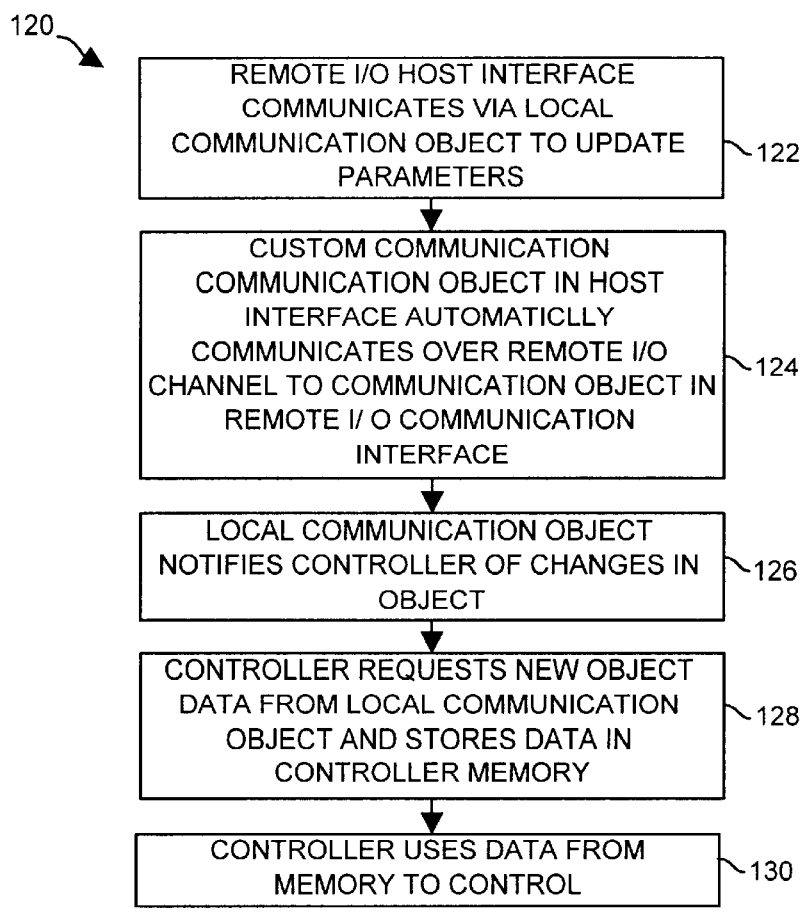
FIG. 4 is an exemplary flow diagram depicting one method by which information is sent from the remote I/O devices to the controller using the communication objects of FIG. 2.

FIG. 4 is an exemplary flow diagram depicting one method 120 by which information is sent from the remote I/O devices 14 and 16 to the controller 12 using the communication objects 70 and 72 of FIG. 2. In general, the method 120 uses the local communication object 70 and the remote communication object 72 to provide seamless or transparent communications between the controller 12 and the remote I/O devices 14 and 16. More specifically, the method 120 allows the remote I/O host interface 44 to use the local communication object 70 to route information published to the interface 44 via the controller databus 28 over the remote I/O communication link 18 and to publish information sent to the interface 44 over the remote I/O communication link 18 to the controller 12 via the controller databus 28. Likewise, the method 120 allows the remote I/O communication interface 46 to use the remote communication object 72 to route information sent to the interface 46 via the remote communication link 18 to one or more of the remote I/O devices 14 and 16 and to send information provided by the I/O devices 14 and 16 over the remote communication link 18 to the remote I/O communication interface 44.

In particular, as shown in FIG. 4, block 122 uses the local communication object 70 to cause the remote I/O host interface 44 to send updated parameters (e.g., signal information, function block information, device information, etc.) to the controller 12 via the controller databus 28. For example, the remote I/O host interface 44 may be configured to periodically send updated function block information, such as the input needed by the AI block 78, to the controller 12. Block 124 uses the local communication object 70 to cause the remote I/O host interface 44 to automatically communicate with the remote I/O communication interface 46 over the remote I/O communication link 18 to retrieve the information or parameters needed by the controller 12. These communications of the remote I/O host interface 44 are received by the remote I/O communication interface 46 and are routed within the remote I/O communication interface 46 using the remote communication object 72 to retrieve the information that is needed by the controller 12. Block 126 notifies the controller 12 of the presence of updated/changed parameters, which may include, for example, an updated input signal for the AI block 78 and block 128 causes the controller 12 to request that the remote I/O host interface 44 publish the updated/changed parameters on the controller databus 28. The controller 12 then receives and stores the published parameter data in the list 96 within the memory 94. Block 130 then uses the parameter data stored in the list 96 to execute the control process 76.

Figure 5:
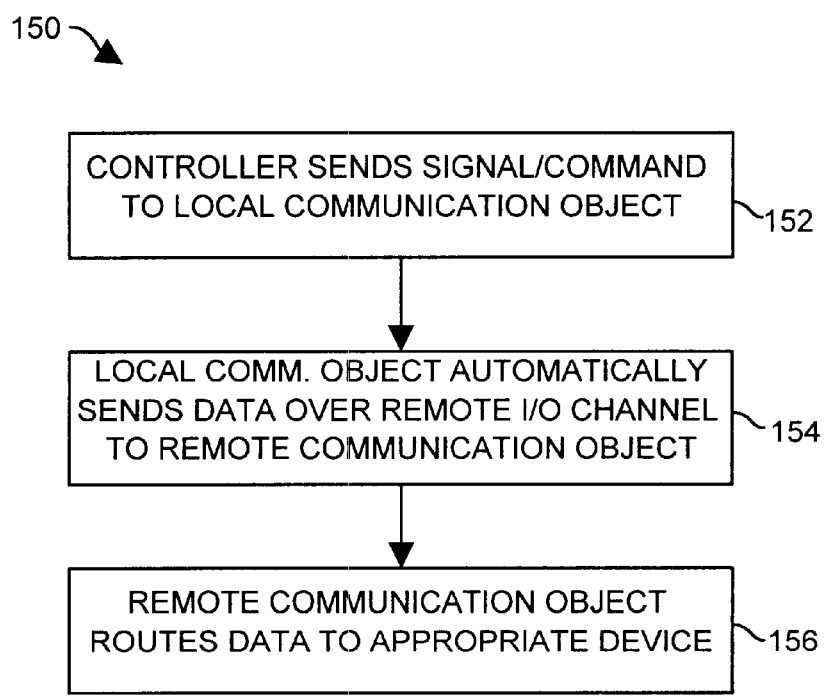
FIG. 5 is an exemplary flow diagram depicting one method by which information is sent from the controller to the remote I/O devices using the communication objects of FIG. 2.

FIG. 5 is an exemplary flow diagram depicting one method 150 by which information is sent from the controller 12 to the I/O devices 14 and 16 using the communication objects 70 and 72 of FIG. 2. Generally speaking, the controller 12 may publish information to the remote I/O host interface 44 via the controller databus 28 and this information may be automatically routed over the remote I/O communication link 18 to one or more of the I/O devices 14 and 16. Also, generally, the controller 12 may be configured to periodically publish information and/or may be configured to publish information in response to requests for information from the user. More specifically, the remote I/O host interface 44 may use the local communication object 70 to automatically route information to the remote I/O communication interface 46 via the remote I/O communication link 18, and the remote I/O communication interface 46 may use the remote communication object 72 to automatically route the information to one or more of the I/O devices 14 and 16 via the remote databus 48.

In particular, as shown in FIG. 5, block 152 causes the controller 12 to send signals and/or commands over the controller databus 28 that are received by the local communication object 70. Block 154 then uses the local communication object 70 to automatically send the signals and/or commands over the remote I/O communication link 18 to the remote I/O communication interface 46 and block 156 uses the remote communication object 72 to route the signals and/or commands to an appropriate one of the I/O devices 14 and 16.

Figure 6:
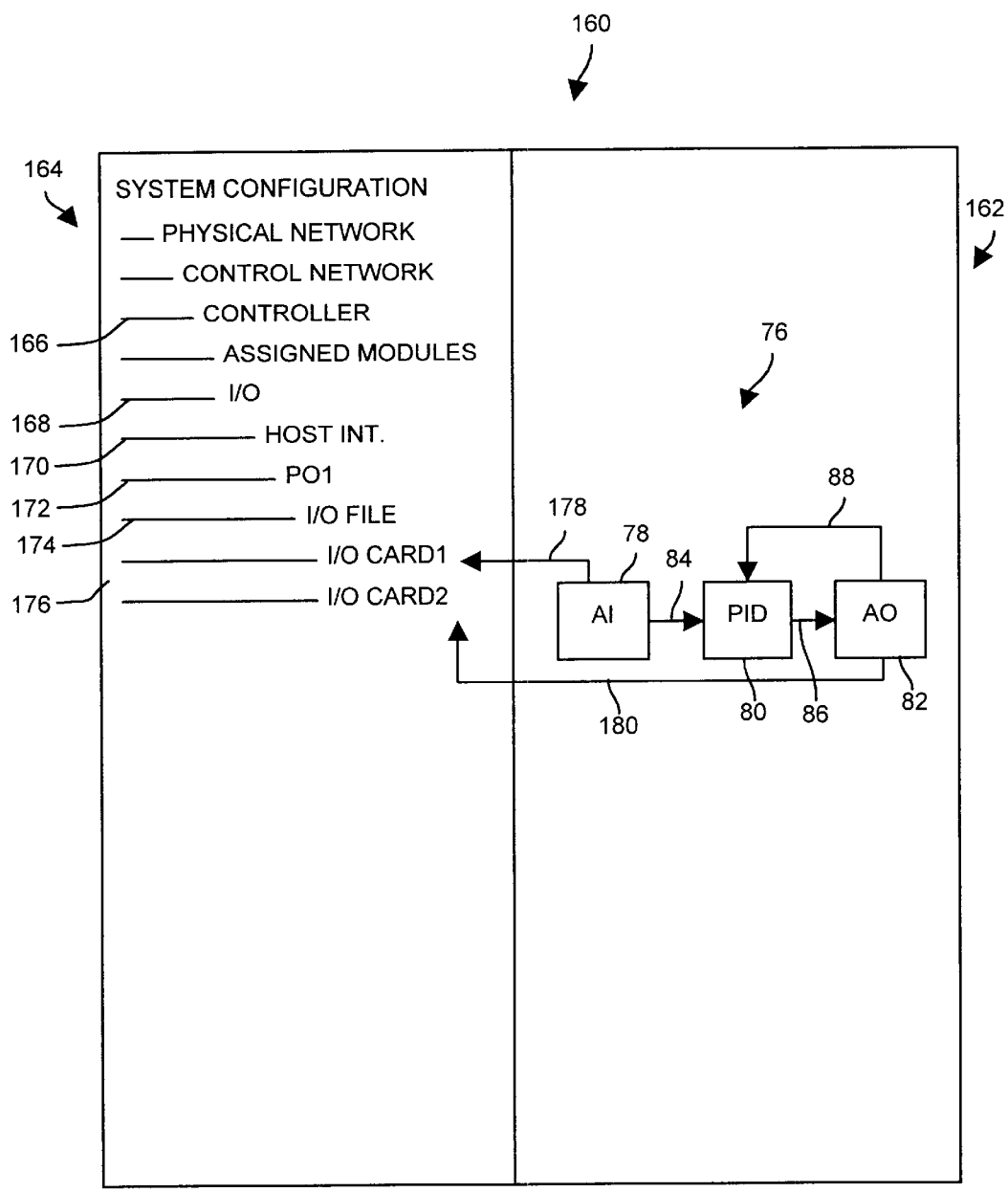
FIG. 6 is a schematic block diagram illustrating a graphical interface that may be used to configure control loops within the process control system of FIG. 1.

FIG. 6 is a schematic block diagram illustrating a graphical interface 160 that may be used to configure control loops within the process control system 10 of FIG. 1. Generally speaking, the graphical interface 160 typically runs within the user interface 20 and sends and receives information related to the configuration of the system 10 over the system level databus 22 to and from the controller 12 and/or other controllers and devices such as a configuration database (not shown) which may be connected to the system level databus 22. The graphical interface 160 provides an intuitive visual environment that allows the user to interactively specify control loops (i.e., specify relationships or connections between function blocks) within the process control system 10 and, at the request of the user, to download the appropriate configuration information to the controller 12 to instantiate the user specified control loops within the controller 12. For example, the controller 12 may use the downloaded configuration information to instantiate the process control loop 76 and may further use the configuration information together with the remote I/O configuration routine 74 to establish the communication objects 70 and 72 within the remote I/O interfaces 44 and 46 which, as described above, enable the control loop 76 to receive the control information needed by the AI block 78 from the remote I/O device 14 via the remote I/O communication link 18.

More specifically, the graphical user interface 160 includes a control loop graphic 162 representing the control loop currently being specified, which is shown by way of example FIG. 6 to be the control loop 76. The graphical user interface 160 also includes a system hierarchy graphic 164 representing the system topology or hardware relationships between the various devices making up the control system 10. In particular, the various levels shown in the system hierarchy graphic 164 may correspond to the various devices shown in FIG. 1. For example, a controller level 166 may correspond to the controller 12, an I/O level 168 may correspond to the group of I/O devices (e.g., I/O devices 24 and 26) that are connected to the controller databus 28, and a host interface level 170, which falls within the I/O level 168, may correspond to the remote I/O host interface 44. The host interface level 170 may further include a communication link level 172 that corresponds to the remote I/O communication link 18 and an I/O file level 174, which includes an I/O device level 176 corresponding to the remote I/O devices 14 and 16. Typically, the textual designators or "tags" used to label and identify each of the levels within the hierarchy graphic 164 are set to a system default which can be modified by the user via the user interface. For example, while the tag for the host interface level 170 may be set to a default "HOST INTERFACE," as shown in FIG. 6, the user could change the tag via the user interface 20 to read "REMOTE I/O INTERFACE 1," if desired.

The graphical user interface 160 allows the user to specify relationships or connections between the function blocks 78, 80 and 82 of the control loop 76 and the I/O devices 14, 16, 24 and 26. More specifically, the user can establish a connection by using a pointing device, such as a computer mouse, to browse the levels 166–176 of the hierarchy graphic 164 to form a relationship between one or more of the function blocks 78, 80 and 82 and an appropriate I/O device (e.g., a channel within an I/O card that is associated with a particular signal and field device). In particular, the user may associate the AI block 78 into the tag "I/O card 1" (within the I/O device level 176) to form a connection 178 between the I/O device 14 (which corresponds to the tag "I/O card 1") and the input of the AI block 78. Likewise, the user may associate the AO block 82 into the tag "I/O card 2" (which corresponds to the I/O device 16) to form a connection 180 between the output of the AO block 82 and the I/O device 16.

While or after the user specifies the connections 178 and 180 between the control loop 76 and the remote I/O devices 14 and 16 (which are represented by the respective tags "I/O device 1" and "I/O device 2") using the above-described procedure, the user interface 20 automatically creates the appropriate configuration information for downloading to the controller 12. This configuration information contains linking information that may be used by the remote I/O configuration routine 74 to create the communication objects 70 and 72 within the respective remote I/O devices 44 and 46, thereby enabling the above-described transparent communications between the controller 12 and the remote I/O devices 14 and 16.

While the connections 178 and 180 from the function blocks 78 and 82 to the remote I/O devices 14 and 16 require communications over the remote I/O communication link 18, the user may, generally speaking, specify function block connections to any combination of remote I/O devices that communicate via the remote I/O communication link 18 and local I/O devices (e.g., I/O devices 24 and 26) that communicate with the controller 12 via the controller databus 28. Additionally, the user may interact with the same graphical interface 160 in conjunction with the above-described technique to form connections between I/O devices and function blocks regardless of whether the connections are made to a remote I/O device or to a local I/O device. As a result, the user experiences a consistent look and feel at the user interface 20 regardless of which I/O devices are being connected to the control loop 76 and regardless of the technology and configuration attributes of the underlying the communications that are used to accomplish the connections.

A more detailed discussion of process control configuration routines which enable a user to graphically create process control routines and elements to auto-sense devices within a process control system and to provide control of devices within a process control system may be found in U.S. Pat. No. 5,838,563 to Dove et al. ("System for Configuring a Process Control Environment"), U.S. Pat. No. 5,828,851 to Nixon et al. ("Process Control System Using Standard Protocol Control of Standard Devices and Non-standard Devices"), and U.S. patent application Ser. No. 08/631,458 to Dove ("System for Assisting Configuring a Process Control Environment") filed Apr. 12, 1996, all of which are assigned to the assignee of the present invention, and all of which are expressly incorporated herein by reference.

Figure 7:
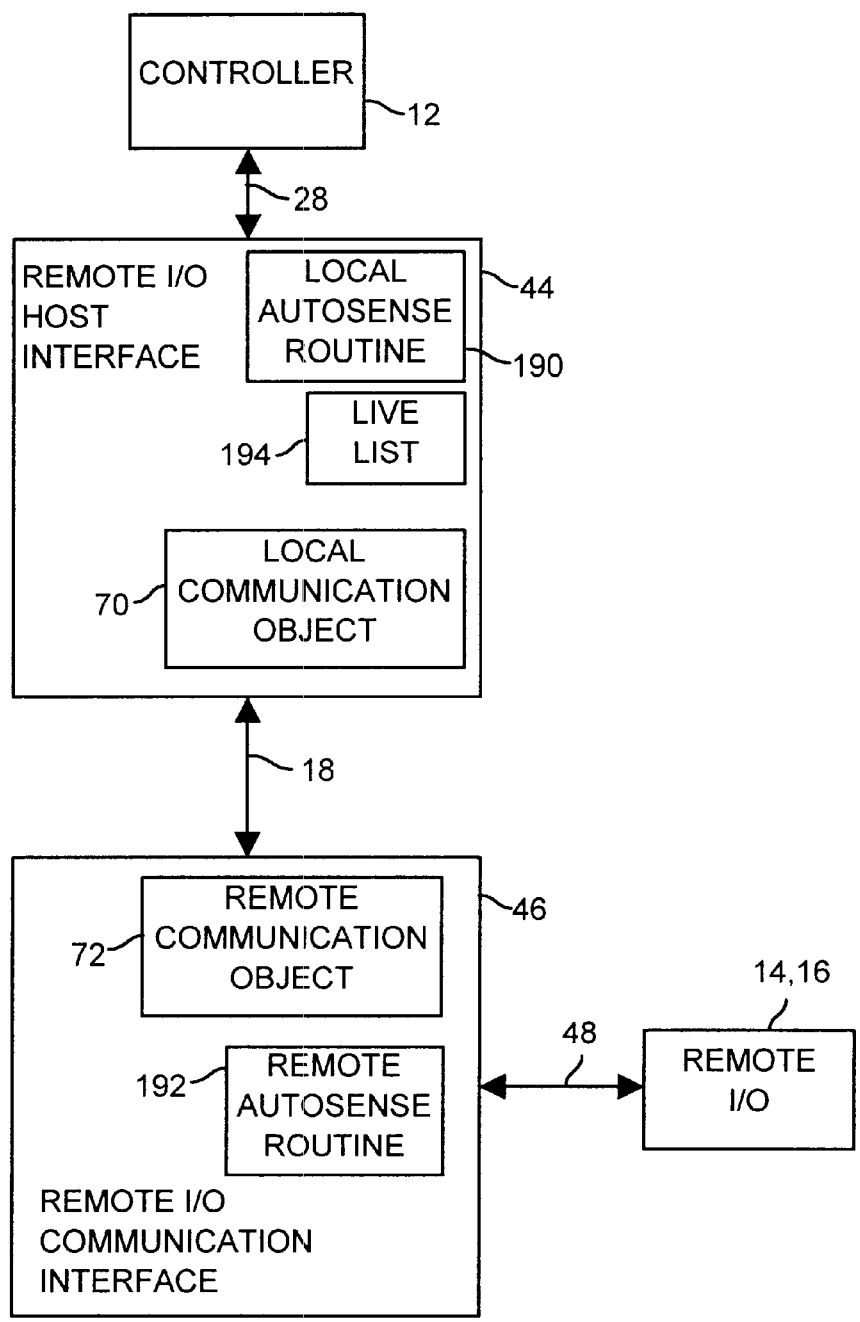
FIG. 7 is a schematic block diagram illustrating autosense routines that may be used in the remote I/O interfaces to enable the automatic detection of and communication with the remote I/O devices of FIG. 1.

FIG. 7 is a schematic block diagram illustrating autosense routines 190 and 192 that may be used in the remote I/O interfaces 44 and 46 to enable the automatic detection of and communication with the remote I/O devices 14 and 16 of FIG. 1. Generally speaking, the autosense routines 190 and 192 enable the controller 12 to automatically identify the presence of the remote I/O devices 14 and 16 on the remote databus 48. More specifically, the remote autosense routine 192 scans the remote databus 48 and collects device information from I/O devices connected to the databus 48, which in this case, for example, are the remote I/O devices 14 and 16. However, any other number or types of I/O devices could be connected to the databus 48. The remote autosense routine 192 uses the remote communication object 72 to automatically send the device information collected via the databus 48 over the remote I/O communication link 18 to the remote I/O host interface 44. The local communication object 70 receives the collected device information and automatically routes it to the autosense routine 190 within the remote I/O host interface 44. The local autosense routine 190 then updates a live list 194 which maintains a list of active I/O devices connected to the remote databus 48, which in this case may be the remote I/O devices 14 and 16. The local autosense routine 190 may also receive an autosense command from the controller 12 and send a command to initiate the remote autosense routine 192. The autosense routines 190 and 192 may be the same type of autosense routines now implemented by a controller for local I/O devices and as such are not described in more detail herein. A more detailed discussion of such autosense routines may be found in U.S. patent application Ser. No. 08/631,519 to Nixon et al. ("Process Control System Including a Method and Apparatus for Automatically Sensing the Connection of Devices To a Network") filed Apr. 12, 1996, which is assigned to the assignee of the present invention and which is expressly incorporated herein by reference.

Figure 8:
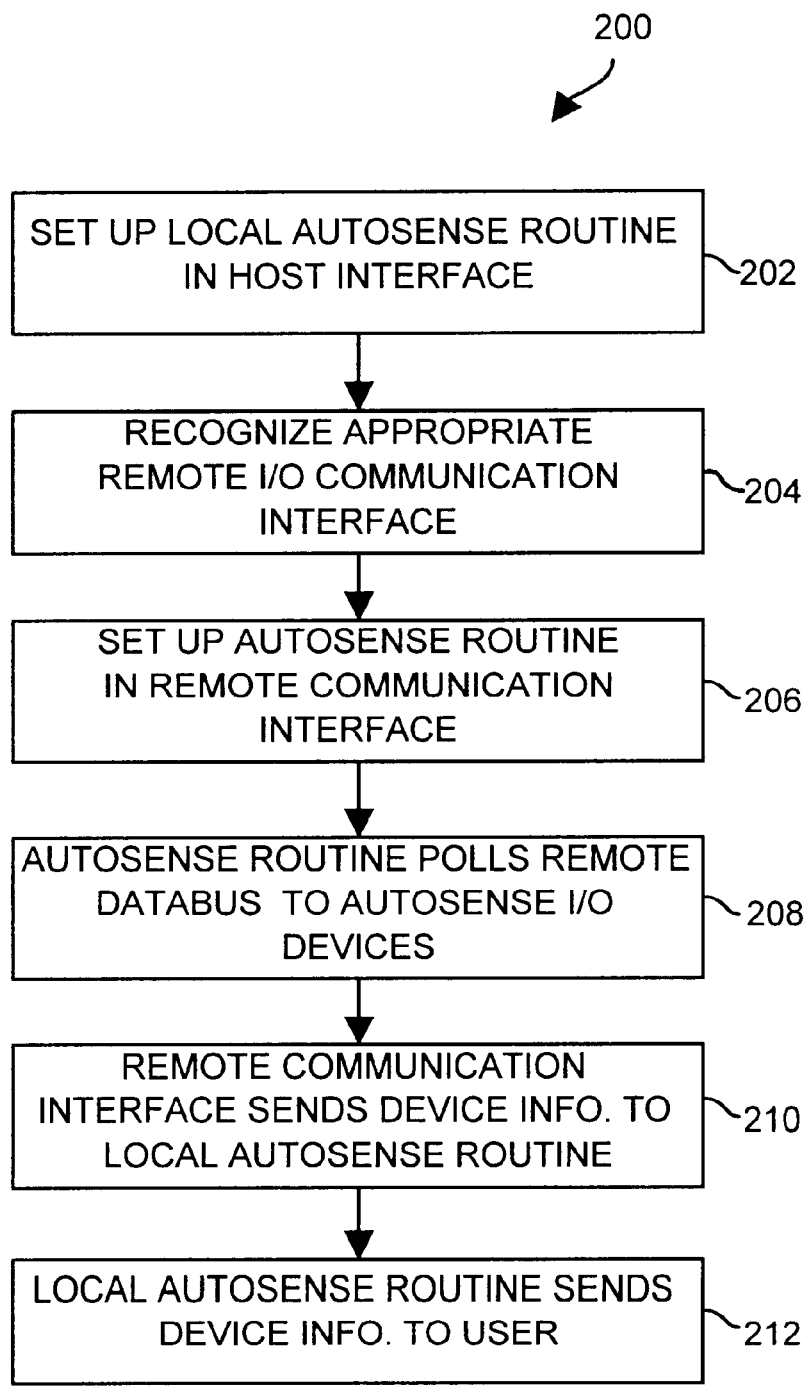
FIG. 8 is an exemplary flow diagram depicting one method of establishing the autosense routines of FIG. 7.

After the remote I/O devices 14 and 16 have been detected using the above-described autosense routines 190 and 192, the controller 12 may then access the live list 194 to retrieve the collected device information, which may subsequently be stored by the controller 12 in the list 96. The controller 12 may pass the collected device information associated with the remote I/O devices 14 and 16 to the user interface 20, which may, for example, update the hierarchy graphic 164 to include the tags "I/O device 1" and "I/O device 2" within the hierarchy representing the I/O devices 14 and 16. Additionally, the device information related to the I/O devices 14 and 16 may be used to form the connections 178 and 180 and to generate the communication objects 70 and 72 that instantiate the connections 178 and 180. FIG. 8 is an exemplary flow diagram depicting one method 200 of establishing the autosense routines 190 and 192 of FIG. 7. Block 202 sets up the local autosense routine 190 within the host interface block 44 and block 204 uses the local communication object 70 to recognize that the local autosense routine 190 requires communications over the remote I/O communication link 18. Block 206 sets up the remote autosense routine 192 in the remote I/O communication interface 46 and then block 208 uses the remote autosense routine 192 to poll the remote databus 48 for I/O devices and collects device information (e.g., device type, manufacturer, addresses, tags, serial numbers, functional roles, etc.) from all I/O devices present on the bus 48. Block 210 then uses to the remote communication object 72 to send the collected device information over the remote I/O communication link 18 to the remote I/O host interface 44, which then uses the local communication object 70 to automatically route the device information to the local autosense routine 190. Block 212 uses the local autosense routine to send the device information to the user interface 20 via the controller databus 28 and the controller 12, as described above.

Accordingly, The system and method described herein enables the seamless integration of remotely situated I/O devices within a distributed process control system. The system and method automatically configures a remote I/O interface device at each end of a remote I/O communication link so that all communication activities with the remote I/O devices over the remote I/O communication link appear to be transparent from the perspective of and a user at a user interface and a controller that is communicating over the remote I/O communication. The system may also allow the user to interact at the system level through a graphic interface running on the user interface, for example, to configure control loops, monitor process parameters, etc. associated with a combination of local and remote I/O devices without having to understand, or even be aware of, the underlying communication technologies used by the remote I/O devices. In other words, the system and method described herein insulates the user from the implementation details of the underlying remote I/O communication technologies by automatically generating and instantiating appropriate communication objects within the remote I/O interface devices in response to the user requesting a control loop connection to a remote I/O device. As a result, the user's interaction with the system has a consistent look and feel regardless of whether or not the user has specified a connection to a remote or a local I/O device and regardless of the underlying communication technologies being used to accomplish the remote I/O communications.

Generally, the above-described system and method may be efficiently implemented using one or more general purpose processors to execute a number of software code segments or modules that are retrieved from a computer readable memory. However, other combinations of hardware and software using, for example, algorithm specific integrated circuits (i.e., ASICs) or other types of hardware may be used to accomplish the same functions without departing from the scope of the invention. If implemented in software, the functional blocks and routines discussed herein may be stored in any computer readable memory such as on a magnetic, optical, or other storage medium, in a RAM or ROM of a computer, controller, field device, etc. Likewise, this software may be delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of configuring a communication link for use in a distributed process control system having a controller, a first remote I/O interface communicatively coupled to the controller and a remote I/O communication link, a second remote I/O interface communicatively coupled to the remote I/O communication link, and an I/O device communicatively coupled to the second remote I/O interface, the method comprising the steps of:

specifying a connection between the controller and the I/O device, wherein specifying the connection includes receiving an input from a user through a graphical user interface;

recognizing that the connection between the controller and the I/O device requires communications over the remote I/O communication link;

automatically generating a first communication object based on the connection between the controller and the I/O device that automatically routes communications between the controller and the remote I/O communication link and that receives communications having a first signal protocol and converts the communications to a second signal protocol; and automatically generating a second communication object based on the connection between the controller and the I/O device that automatically routes communications between the remote I/O communication link and the I/O device.

2. The method of claim 1, wherein the step of automatically generating the second communication object includes the step of automatically generating the second communication object so that the second communication object receives communications having the second signal protocol and converts the communications to the first signal protocol.

3. The method of claim 1, wherein the step of specifying the connection between the controller and the I/O device includes the step of specifying a relationship between a process control loop associated with the controller and the I/O device.

4. The method of claim 3, wherein the step of specifying the relationship between the process control loop associated with the controller and the I/O device includes the step of specifying a relationship between a function block associated with the control loop and a device identifier associated with the I/O device.

5. The method of claim 4, wherein the device identifier associated with the I/O device is a device tag.

6. The method of claim 1, wherein the step of receiving the input from the user through the graphical user interface includes the step of specifying a relationship between a control loop graphic and a hierarchy graphic.

7. The method of claim 6, wherein the step of specifying the relationship between the control loop graphic and the hierarchy graphic includes the step of using a computer pointing device to specify the relationship between the control loop graphic and the hierarchy graphic.

8. The method of claim 1, wherein the step of automatically generating the first communication object includes the step of automatically generating the first communication object within the first remote I/O interface.

9. The method of claim 1, wherein the step of automatically generating the second communication object includes the step of automatically generating the second communication object within the second remote I/O interface.

10. A system for configuring a communication link for use in a process control system having a controller with a processor, a first remote I/O interface communicatively coupled to the controller and a remote I/O communication link, a second remote I/O interface communicatively coupled to the remote I/O communication link, and an I/O device communicatively coupled to the second remote I/O interface, the system comprising:

a computer readable medium;

a first configuration routine stored on the computer readable medium and adapted to be executed by the processor that recognizes a command to form a communication link between the controller and the I/O device;

a second configuration routine stored on the computer readable medium and adapted to be executed by the processor that automatically generates a first communication object based on the communication link between the controller and the I/O device, wherein the first communication object is adapted to automatically route communications between the controller and the remote I/O communication link and to receive communications having a first signal protocol and to convert the communications to a second signal protocol; and a third configuration routine stored on the computer readable medium and adapted to be executed by the processor that automatically generates a second communication object based on the communication link between the controller and the I/O device, wherein the second communication object is adapted to automatically route communications between the remote I/O communication link and the remote I/O device.

11. The system of claim 10, wherein the second communication object is further adapted to receive communications having the second signal protocol and to convert the communications to the first signal protocol.

12. The system of claim 10, wherein the second configuration routine is further adapted to generate the first communication object within the first remote I/O interface.

13. The system of claim 10, wherein the third configuration routine is further adapted to generate the second communication object within the second remote I/O interface.

14. The system of claim 10, wherein the first configuration routine is further adapted to receive in the controller a control strategy that includes the command to form the communication link between the controller and the I/O device.

15. The system of claim 10, further comprising:
a user interface communicatively coupled to the controller;
a fourth routine stored on the computer readable medium and adapted to be executed by the user interface that provides to a user a graphical interface having a process control graphic and a hierarchy graphic;
a fifth routine stored on the computer readable medium and adapted to be executed by the user interface that receives an input from the user through the graphical user interface;
a sixth routine stored on the computer readable medium and adapted to be executed by the user interface that forms a connection between the process control graphic and the hierarchy graphic based on the input from the user; and
a seventh routine stored on the computer readable medium and adapted to be executed by the user interface that generates the command to form a communication link between the controller and the I/O device based on the connection between the process control graphic and the hierarchy graphic.

16. A method of configuring a communication link for use in a process control system having a user interface, a controller coupled to the user interface, a first remote I/O interface communicatively coupled to the controller and a remote I/O communication link, a second remote I/O interface communicatively coupled to the remote I/O communication link, and an I/O device communicatively coupled to the second remote I/O interface, the method comprising the steps of:
specifying within the user interface a connection between the controller and the I/O device;
automatically generating a first communication object based on the connection between the controller and the I/O device, wherein the first communication object is adapted to cause the first remote I/O interface to automatically route communications between the controller and the remote I/O communication link, and wherein the first communication object is adapted to receive communications having a first signal protocol and convert the communications to a second signal protocol; and
automatically generating a second communication object based on the connection between the controller and the I/O device, wherein the second communication object is adapted to cause the second remote I/O interface to automatically route communications between the remote I/O communication link and the I/O device.

17. The method of claim 16, wherein the step of automatically generating the second communication object includes the step of automatically generating the second communication object so that the second communication object receives communications having the second signal protocol and converts the communications to the first signal protocol.

18. The method of claim 16, wherein the step of specifying the connection between the controller and the I/O device includes the step of specifying a relationship between a process control loop associated with the controller and the I/O device.

19. The method of claim 18, wherein the step of specifying the relationship between the process control loop associated with the controller and the I/O device includes the step of specifying a relationship between a function block associated with the control loop and a device identifier associated with the I/O device.

20. The method of claim 19, wherein the device identifier associated with the I/O device is a device tag.

21. A system for configuring a remote input/output (I/O) communication link for use in a process control system having an I/O device communicatively coupled to a remote I/O communication link, the system comprising:
a controller that automatically downloads first and second communication objects in response to a request for a connection between the controller and the I/O device;
a first remote I/O interface communicatively coupled to the controller and the remote I/O communication link, wherein the first remote I/O interface uses the first communication object to automatically route communications between the controller and the remote I/O communication link, and wherein the first communication object receives communications having a first signal protocol converts the communications to a second signal protocol; and
a second remote I/O interface communicatively coupled to the remote I/O communication link and the remote databus, wherein the second remote I/O interface uses the second communication object to automatically route communications between the remote I/O communication link and the I/O device.

22. The system of claim 21, wherein the second communication object receives communications having the second signal protocol and converts the communications to the first signal protocol.

23. The system of claim 21, wherein the connection between the controller and the I/O device is based on a relationship between a process control loop associated with the controller and the I/O device.

24. The system of claim 23, wherein the relationship between the process control loop associated with the controller and the I/O device is based on a relationship between a function block associated with the control loop and a device identifier associated with the I/O device.

25. The system of claim 24, wherein the device identifier associated with the I/O device is a device tag.

26. The system of claim 21, wherein the request for the connection between the controller and the I/O device step is based on an input from a user.

27. The system of claim 26, wherein the input from the user is received through a graphical user interface.

28. The system of claim 27, wherein the input from the user received through the graphical user interface is based on a relationship between a control loop graphic and a hierarchy graphic.

29. The system of claim 28, wherein the relationship between the control loop graphic and the hierarchy graphic is specified using a computer pointing device.

* * * * *

UNITED STATES PATENT AND TRADEMARK OFFICE
CERTIFICATE OF CORRECTION

PATENT NO.    : 6,711,629 B1
DATED         : March 23, 2004
INVENTOR(S)   : Daniel D. Christensen et al.

It is certified that error appears in the above-identified patent and that said Letters Patent is hereby corrected as shown below:

Drawings,
Sheet 3, Figure 4, 2$^{nd}$ box, line 2, delete "AUTOMATICALLY" and insert
-- AUTOMATICALLY --.

Column 1,
Line 42, delete "WORLDFLIP" and insert -- WORLDFIP --.

Column 11,
Line 44, delete "of the underlying the communications" and insert -- of the underlying communications --.
Lines 56-57, delete "U.S. patent application Ser. No. 08/631,458 to Dove ("System for Assisting Configurating a Process Control Environment") filed Apr. 12, 1996" and insert -- U.S. patent No. 5,940,294 issued August 17, 1999 --

Column 12,
Lines 25-26, delete "U.S. patent application Ser. No. 08/631,519 to Nixon et al. ("Process Control System Including a Method and Apparatus for Automatically Sensing the Connection of Device To a Network") filed Apr. 12, 1996" and insert -- U.S. patent No. 6,098,116 issued August 1, 2000 --
Line 58, delete "uses to the remote communication object" and insert -- uses the remote communication object --.

Column 13,
Line 6, delete "of and a user" and insert -- of a user --.

Signed and Sealed this

Thirty-first Day of August, 2004

JON W. DUDAS
*Director of the United States Patent and Trademark Office*